United States Patent
Hu et al.

(10) Patent No.: US 10,401,014 B2
(45) Date of Patent: Sep. 3, 2019

(54) SEALED WAVELENGTH CONVERSION DEVICE AND COOLING SYSTEM

(71) Applicant: APPOTRONICS CORPORATION LIMITED, Shenzhen (CN)

(72) Inventors: Fei Hu, Shenzhen (CN); Zifeng Tian, Shenzhen (CN); Yi Yang, Shenzhen (CN); Wei Fu, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 587 days.

(21) Appl. No.: 14/785,309

(22) PCT Filed: Apr. 11, 2014

(86) PCT No.: PCT/CN2014/075136
§ 371 (c)(1),
(2) Date: Oct. 16, 2015

(87) PCT Pub. No.: WO2014/173234
PCT Pub. Date: Oct. 30, 2014

(65) Prior Publication Data
US 2016/0069558 A1 Mar. 10, 2016

(30) Foreign Application Priority Data
Apr. 25, 2013 (CN) .......................... 2013 1 0145262

(51) Int. Cl.
*F21V 29/00* (2015.01)
*F21V 29/65* (2015.01)
(Continued)

(52) U.S. Cl.
CPC .............. *F21V 29/65* (2015.01); *F21K 2/00* (2013.01); *G02B 7/008* (2013.01); *G02B 26/008* (2013.01);
(Continued)

(58) Field of Classification Search
CPC ... F21K 9/60; F21K 9/64; G02B 7/008; F21V 29/60–29/677
See application file for complete search history.

(56) References Cited

U.S. PATENT DOCUMENTS 7,264,359 B2    9/2007  Kawahara et al.
7,547,114 B2    6/2009  Li et al.
(Continued)

FOREIGN PATENT DOCUMENTS

CN    101002518 A    7/2007
CN    201233499 Y    5/2009
(Continued)

OTHER PUBLICATIONS

International Search Report in the parent PCT application No. PCT/CN2014/075136, dated Jun. 25, 2014.
(Continued)

*Primary Examiner* — Gerald J Sufleta, II
(74) *Attorney, Agent, or Firm* — Chen Yoshimura LLP

(57) ABSTRACT

Disclosed are a wavelength conversion device and a light emitting device. The wavelength conversion device includes a wavelength conversion layer used for absorbing excitation light and generating converted light; a box having a first area used for transmitting the excitation light to the wavelength conversion layer and a second area used for transmitting the converted light, and further including an air outlet and an air inlet; a conduit, disposed outside the box and used for connecting the air inlet and the air outlet, so as to seal with the box the wavelength conversion layer in the box; a heat exchanger, used for decreasing a gas temperature in the conduit; and a gas circulation device, disposed in sealed space encircled by the box and the conduit, and used for driving exchange between gas in the box and gas in the
(Continued)

conduit. The wavelength conversion device achieves both dust prevention and heat dissipation.

12 Claims, 9 Drawing Sheets

(51) Int. Cl.
  *G02F 1/13357* (2006.01)
  *F21K 2/00* (2006.01)
  *G02B 7/00* (2006.01)
  *G02B 26/00* (2006.01)
  *G02F 1/1335* (2006.01)
  *G03B 21/16* (2006.01)
  *G03B 21/20* (2006.01)

(52) U.S. Cl.
  CPC ............. *G02F 1/1336* (2013.01); *G02F 2001/133614* (2013.01); *G02F 2001/133628* (2013.01); *G02F 2201/36* (2013.01); *G03B 21/16* (2013.01); *G03B 21/204* (2013.01)

(56) References Cited

U.S. PATENT DOCUMENTS

| | | | |
|---|---|---|---|
| 2006/0157230 | A1 | 7/2006 | Kawahara et al. |
| 2008/0310010 | A1 | 12/2008 | Kinoshita |
| 2012/0013854 | A1 | 1/2012 | Nishimura et al. |
| 2012/0097376 | A1 | 4/2012 | Lin et al. |
| 2012/0152778 | A1 | 6/2012 | Lin et al. |
| 2013/0128589 | A1* | 5/2013 | Kim .................. F21S 8/026 362/294 |
| 2013/0258671 | A1* | 10/2013 | Baumann ............ F21V 29/70 362/293 |
| 2015/0009702 | A1* | 1/2015 | Fiederling ......... F21V 23/008 362/547 |

FOREIGN PATENT DOCUMENTS

| | | |
|---|---|---|
| CN | 102193292 A | 9/2011 |
| CN | 102455580 A | 5/2012 |
| CN | 102573369 A | 7/2012 |
| CN | 102853377 A | 1/2013 |
| JP | S56-84627 A | 7/1981 |
| JP | 2006-146109 A | 6/2006 |
| JP | 2007-157385 A | 6/2007 |
| JP | 2008-309877 A | 12/2008 |
| JP | 4462295 A | 5/2010 |
| JP | 2010-218840 A | 9/2010 |
| JP | 2010218840 A * | 9/2010 |
| JP | 2011-243375 A | 12/2011 |
| JP | 2012-142188 A | 7/2012 |
| JP | 2012-181431 A | 9/2012 |
| JP | 2013-025249 A | 2/2013 |
| TW | 201228569 A | 7/2012 |

OTHER PUBLICATIONS

IPRP in the parent PCT application No. PCT/CN2014/075136, dated Oct. 27, 2015.
Chinese Office Action, dated Dec. 1, 2014, and Search Report dated Nov. 21, 2014, in a counterpart Chinese patent application, No. CN 201310145262.2.
Chinese Office Action, dated Mar. 21, 2016, and Search Report dated Mar. 15, 2016, in a counterpart Chinese patent application, No. CN 201510408424.6.
Chinese Office Action, dated Aug. 31, 2016 in a counterpart Chinese patent application, No. CN 201510408424.6.
Supplementary European Search Report and Written Opinion, dated Nov. 11, 2016, in a counterpart EP application, No. EP 14788960.4.
Japanese Office Action, dated Sep. 6, 2016 in a counterpart Japanese patent application, No. JP 2016-509275.
Japanese Office Action, dated Mar. 14, 2017 in a counterpart Japanese patent application, No. JP 2016-509275.
Korean Office Action, dated Sep. 19, 2017 in a counterpart application KR 10-2015-7032501.
Korean Office Action, dated Jan. 29, 2018 in a counterpart application KR 10-2015-7032501.
Taiwanese Office Action, dated May 27, 2015, in a counterpart Taiwanese patent application, No. TW 103112866.

* cited by examiner

SEALED WAVELENGTH CONVERSION DEVICE AND COOLING SYSTEM

BACKGROUND OF THE INVENTION

Field of the Invention

This invention relates to illumination and display fields, and in particular, it relates to a wavelength conversion device and related light emitting device.

Description of Related Art

In conventional illumination system or projection system, the light emitting device often employs an excitation light to excite a wavelength conversion material in a wavelength conversion layer to generate a converted light. However, because during the excitation process the wavelength conversion efficiency of the particles of wavelength conversion material cannot be 100%, the lost energy becomes heat, causing heat accumulation and rapid temperature increase of the wavelength conversion material particles, directly impacting the light emission efficiency and useful life of the wavelength conversion material.

A common solution for this problem is that, by using a drive device to drive the wavelength conversion layer to move, the light spot formed by the excitation light on the wavelength conversion layer acts upon the wavelength conversion layer along a predetermined path. This way, the wavelength conversion material in each unit area will not be constantly illuminated by the excitation light, so the heat accumulation in the wavelength conversion material in the unit area is reduced.

However, with the increased demand on the output light power for illumination systems and projection systems, the light power of the excitation light also increases. The higher the light power density of the excitation light, the lower the light emitting efficiency of the wavelength conversion material. When the light power density of the excitation light reaches a certain level, the wavelength conversion material experience a quenching effect, i.e., the light emitting efficiency of the wavelength conversion material decreases dramatically.

Therefore, to ensure high light conversion efficiency of the wavelength conversion material, in conventional technology, the wavelength conversion material layer all operate in an open environment.

Through study and experiments with the conventional technology, the inventors of the present invention discovered that, because of the open operation environment of the wavelength conversion layer, dust can fall on the wavelength conversion layer and optical components (e.g. lens) located near the wavelength conversion layer. Because dust absorbs light well, the adhered dust increases the light energy absorption by the wavelength conversion layer and the optical component. The more the adhered dust, the more the absorbed light energy by the wavelength conversion layer and the optical component. Thus, in the presence of a large amount of dust and when the light power density of the excitation light is high, the wavelength conversion layer and the optical component absorbs a large amount of light every and their surfaces can be burned and become dark, which impacts the light emitting sufficiency of the wavelength conversion layer and shortens the life of the optical component. Therefore, dust prevention and heat dissipation of the wavelength conversion layer are contradictory aspects of the design and cannot be both satisfied.

SUMMARY

Embodiments of the present invention solve the above problems and provide a wavelength conversion device and related light emitting device, which can achieve both dust prevention and heat dissipation.

An embodiment of the present invention provides a wavelength conversion device, which includes:

A wavelength conversion layer for absorbing an excitation light and generating a converted light;

A box, which includes a first area for transmitting the excitation light to the wavelength conversion layer and a second area for transmitting the converted light, and further includes an air inlet and an air outlet;

A conduit, disposed outside of the box, for connecting the air inlet and the air outlet, which cooperates with the box to seal the wavelength conversion layer inside the box;

A heat exchanger, for lowering the temperature of the air (or any gas) inside the conduit;

An air circulation device, disposed in the sealed space formed by the box and the conduit, for driving air exchange between the box and the conduit.

Another embodiment of the present invention provides a light emitting device, which includes the above wavelength conversion device.

Compared to conventional technology, embodiments of the present invention have the following advantages:

In embodiments of the present invention, through the box and the conduit that connects the air inlet and outlet on the box, the wavelength conversion layer is sealed, which prevents duct accumulation affecting the light emitting efficiency of the wavelength conversion material. Further, by using the heat exchanger to lower the air temperature in the conduit, and by using the air circulation device to drive the air exchange between the box and the conduit, the wavelength conversion material can maintain a relatively low working temperature in the sealed environment, which prevents the heat from impacting the light emitting efficiency of the wavelength conversion material. Thus, both the dust prevention problem and the heat dissipation problem in the conventional technology are solved.

DETAILED DESCRIPTION OF PREFERRED EMBODIMENTS

Figure 1A:
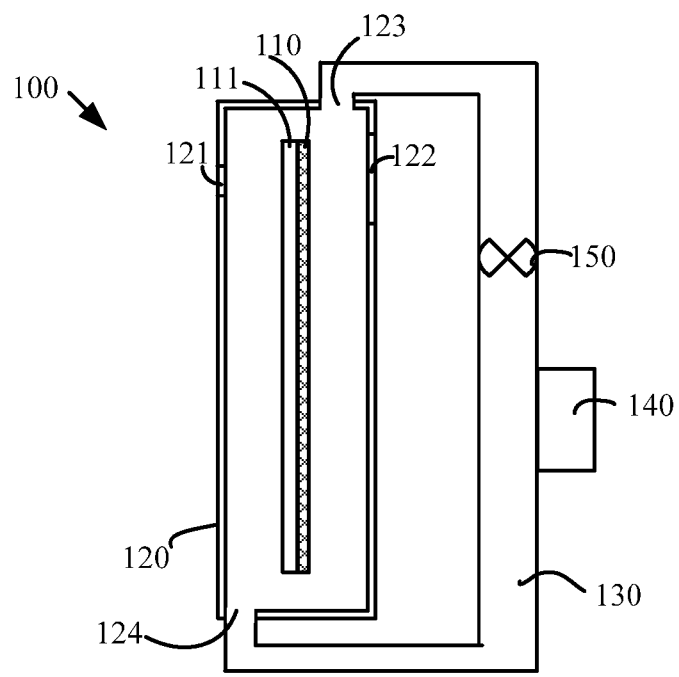
FIGS. 1A and 1B respectively schematically illustrate the structures of a transmission-type and a reflection-type wavelength conversion device according to embodiments of the present invention.

Embodiments of the present invention are described below with reference to the drawings.

First Embodiment

Referring to FIG. 1, which schematically illustrates the structure of a wavelength conversion device according to an embodiment of the present invention. As shown in FIG. 1, the wavelength conversion device 100 includes a wavelength conversion layer 110, a box 120, a conduit 130, a heat exchanger 140 and an air circulation device 150.

The wavelength conversion layer 110 is used to absorb an excitation light and generate a converted light. The wavelength conversion layer 110 includes wavelength conversion material. A common wavelength conversion material is phosphor powder, such as YAG (yttrium aluminum garnet) phosphor, which can absorb blue excitation light and generate a yellow converted light. The wavelength conversion material may also be quantum dots, fluorescent dye, and other materials that have wavelength conversion properties, in addition to phosphors. In many situations, the wavelength conversion material is a power or particulate form, and is difficult to form into a wavelength conversion layer directly; in such a case, an adhesive material may be used to adhere the wavelength conversion material particles together, and form predefined shapes, such as a plate shape.

In this embodiment, the wavelength conversion device 110 further includes a substrate 111 stacked with the wavelength conversion layer 110, the substrate 111 being used to carry the wavelength conversion layer 110. In fact, the wavelength conversion material can be mixed in a hard material (such as transparent glass plate) to form a wavelength conversion layer; in such a case, the substrate for carrying the wavelength conversion layer can be omitted from the wavelength conversion device 100.

The box 120 is used to seal the wavelength conversion device 100. The box 120 can have a regular shape or any irregular shape. For example, in the situation where the wavelength conversion layer 110 is a ring shape, the box 120 can also have a ring shape matching the ring shape of the wavelength conversion layer 110. In this embodiment, the substrate 111 is a round plate shape, and the box 120 is a round shape matching that of the substrate 111.

The box 120 includes a first area 121 for transmitting the excitation light to the wavelength conversion layer 110 and a second area 122 for transmitting the converted light, where both regions are air tight. In this embodiment, the wavelength conversion device 100 is a transmission type device, i.e., the incident light and output light of the wavelength conversion device are in the same direction, and the substrate 111 transmits the excitation light. The first area 121 and the second area 122 of the box 120 can both be made of ordinary light transmitting plate. In applications that only requires the converted light, the first area preferably uses a filter plate that only transmits the excitation light, and the second area 122 preferably uses a filter plate that transmits the converted light and reflects the excitation light, to improve the purity of the output light of the wavelength conversion device. In applications that requires both the converted light and the excitation light, the second area 122 preferably uses a filter plate that only transmits the excitation light and the converted light.

In this embodiment, the substrate 111 is located between the first area 121 and the wavelength conversion layer 110, and the wavelength conversion layer 110 is located between the substrate 111 and the second area 122. The substrate 111 is made of a filter plate that transmits the excitation light and reflects the converted light, to reflect the converted light generated by the wavelength conversion layer 110 that travels in the direction opposite the light output direction of the wavelength conversion device back to the output direction. This increases the light output efficiency of the wavelength conversion device 100.

The box 120 further includes an air outlet 123 and an air inlet 124. The wavelength conversion device 100 further includes a conduit 130, disposed outside of the box 120, for connecting air outlet 123 and the air inlet 124, so that the conduit cooperate with the box 120 to seal the wavelength conversion layer 110 in the box 120. It should be understood that the air outlet 123 and the air inlet 124 can be located at any area of the box 120 except for the first area 121 and the second area 122, so that the conduit does not block the excitation light and the converted light, which avoids light loss.

The heat exchanger 140 is located outside of the conduit 130, and used to lower the air temperature inside the conduit 130. In practical applications, the heat exchanger 140 can also be located inside the conduit 130, which can also achieve the effect of lowering the air temperature inside the conduit 130. However, in the former case, because the heat exchanger 140 does not need to be placed inside the conduit 130, the diameter of the conduit 130 can be relatively small, which reduces cost. Or, the conduit 130 can have different diameters at different places; at the location of the heat exchanger 140 the diameter is larger to accommodate the heat exchanger 140, while the diameter is smaller elsewhere.

In practical applications, the heat exchanger 140 may have various forms; in this embodiment, the heat exchanger 140 uses heat dissipation fins. The heat dissipation fins 140 may be fixedly mounted on the outside surface of the conduit 130, by welding, adhesive or other means. The surface of the heat dissipation fins that contacts the outside surface of the conduit 130 constitutes the heat dissipation surface. Because the heat dissipation fins are made of a metal material with high thermal conductivity, the heat conducted from the heat dissipation surface can be rapidly spread by the heat dissipation fins to other surfaces of the heat dissipation fins, and dissipated to the environment via the contact between these surfaces and the air. By using desired shapes and sizes of the heat dissipation fins 140, the heat dissipation fins can lower the temperature of the outer surface of the conduit 130, and in turn lower the air temperature inside the conduit 130.

The heat exchanger 140 can be other forms, such as heat pipes. Heat dissipation by heat pipes uses liquid evaporation to rapidly transfer heat from the first end of the heat pipe to the second end, so as to dissipate heat from the first end. If heat pipes are used as the heat exchanger of this embodiment, then the surface connected to the first end of the heat pipes constitutes the heat dissipation surface. The heat exchanger 140 can also be a refrigeration device, such as a thermoelectric cooling device. A thermoelectric cooling device uses solid-state heat pumps, by applying an electric voltage between the positive and negative terminals to generate a temperature difference between a cooling surface and a heating surface, where the temperature of the cooling surface is lower than the temperature of the heating surface. If a thermoelectric cooling device is used as the heat exchanger of the present embodiment, the cooling surface of the thermoelectric cooling device contacts the outer surface of the conduit 130. This way, the air temperature inside the conduit 130 is even lower, which is more beneficial for the heat dissipation of the wavelength conversion layer 110 in the box 120.

In this embodiment, because the function of the heat exchanger 140 is to lower the air temperature inside the conduit 130, in practical applications, the heat exchanger 140 and the conduit 130 can be integrated as one device. In a specific example, the conduit 130 may be a copper pipe with an extended length. Because copper has good thermal conductivity, when the high temperature air passes through the copper pipe of sufficient length, the heat is dissipated to the environment via the copper pipe, so the air temperature is lowered to achieve the heat dissipation effect. Of course, the conduit 130 may also be pipes made of other metals, such as aluminum pipe, stainless steal pipe, etc. For applications with relatively low heat dissipation requirement, these other materials may be used. Because a separate heat exchanger 140 is not needed, this design has lower cost.

It should be noted that the conduit 130 does not have to be one physical channel, so long as it can allow air to exit the box 120 from the air outlet 123, interact with the heat exchanger 140, and then return to the box 120 from the air inlet 124. For example, the conduit 130 can be formed of two channels, one end of each channel is connected to the refrigeration device (such as a semiconductor refrigeration device), and the other ends of the two channels are respectively connected to the air outlet 123 and air inlet 124.

It should be understood that the conduit 130 does not have to be a round shaped channel, and can have other shapes, such as a square shape, so long as it can form a sealed space for heat dissipation or refrigeration for the hot air from the box 120.

The air circulation device 150 is disposed inside the sealed space formed by the box 120 and conduit 130, for driving air exchange between the box 120 and the conduit 130. In this embodiment, the air circulation device 150 is disposed inside the conduit 130; more specifically, it may be an axial-flow fan. An axial-flow fan works by using the propelling force of the blades of the fan to push the air to flow in the axial direction of the axial-flow fan. Therefore, due to the pressure difference between the box 120 and the conduit 130, the air inside the box 120 enters the conduit 130 from the air outlet 123 of the box 120; after passing through the heat exchanger 140 to lower its temperature, the air enters the 120 from the air inlet 124 under the action of the air circulation device 150. By such circulation, the cool are in the conduit 130 and the hot air in the 120 are constantly exchanged, to lower the temperature inside the box 120.

It should be understood that, to increase the speed of the air flow, two or more air circulation devices 150 may be provide in the conduit 130; for example, two air circulation devices 150 can be provided respectively at the locations where the conduit 130 is connected to the air outlet 123 and to the air inlet 124. Or the axial-flow fan 150 can be placed inside the box 120. Because the axial-flow fan 150 is used to drive the air exchange between the box 120 and the conduit 130, due to the working principle of the axial-flow fan 150, if located inside the box 120, the axial-flow fan 150 should be placed to face the air inlet 124 or the air outlet 123 of the box 120.

Further, because the air circulation device needs to have a power line, the box 120 or the conduit 130 further includes an opening (not shown in the drawings) sized to allow the power line to pass through. Preferably, the opening is provided with a rubber ring around the power line to seal the opening, to ensure the sealing of the system.

To generate sufficient circulation of the hot air in the box 120 and the cool air in the conduit 130, the air outlet 123 and the air inlet 124 are preferably located at two places of the box 120 as far away from each other as possible. The air inlet 124 is preferably located relatively close to the light spot formed on the wavelength conversion layer 110 by the excitation light, to more effectively dissipate the heat generated at that spot on the wavelength conversion layer 110. To be "relatively close to" means that, of the set of distances between all points of the box 120 and the excitation light spot formed on the wavelength conversion layer 110, the distance between the air inlet 124 and the light spot is among the shortest 50% of all such distances. Because the side of the wavelength conversion layer 110 that face the excitation light generates the most heat, the air inlet 124 is preferably located on the side of the plane of the wavelength conversion layer 110 that faces the excitation light. To make the circulated air pass by the wavelength conversion layer 110, correspondingly, the air outlet is preferably located on the side of the plane of the wavelength conversion layer 110 that faces away from the excitation light.

Compared with conventional technology, in this embodiment, by sealing the wavelength conversion layer using the box and the conduit that connects the air outlet and air inlet of the box, it can prevent dust from affecting the light emission efficiency of the wavelength conversion material. Moreover, by lowering the air temperature in the conduit using a heat exchanger, and by using the air circulation device to drive air exchange between the box and the conduit, the wavelength conversion material can be maintained at a relatively low working temperature in the sealed environment, which prevents the heat from affecting the light emission efficiency of the wavelength conversion material. This simultaneously solves the dust prevention problem and the heat dissipation problem for the color wheel in the conventional technology.

Figure 1B:
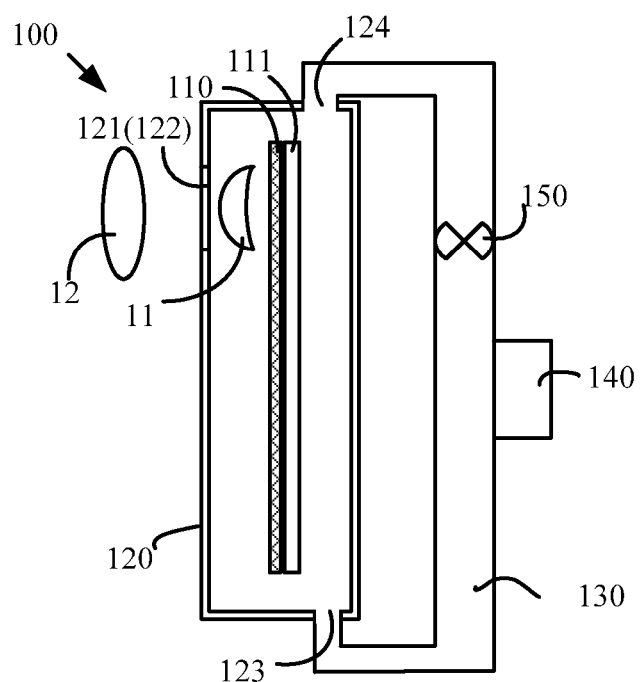

Refer to FIG. 1B, which schematically illustrates the structure of a wavelength conversion device according to another embodiment of the present invention. In this embodiment, the wavelength conversion device 100 is a reflection type, i.e., the direction of the output light of the wavelength conversion device 100 is the opposite of its light input direction. Thus, the first area 121 and the second area 122 are combined as one region; the wavelength conversion layer 110 is located between the first area 121 (second area 122) and the substrate 111, and the substrate 111 reflects the converted light generated by the wavelength conversion layer 110. Preferably, the substrate 111 is a reflection mirror, to reflect the excitation light that is unabsorbed by the wavelength conversion layer back to the wavelength conversion layer 110. Correspondingly, the first area 121 and the second area 122 can be made of an ordinary light transmitting material, or a filter plate that transmits the excitation light and the converted light. Compared to the transmission type wavelength conversion device, the reflection type device can reduce loss of the excitation light and collect more converted light. For ease of description, examples below use reflection type devices. In practical applications, the embodiments below may also be used in transmission type wavelength conversion devices.

The air inside the box may contain dust or other impurity particles. These particles may fall on the wavelength conversion layer, absorb a part of the excitation light to cause light energy loss, and burn the wavelength conversion layer. Because the air that enters the conduit 130 from the air outlet 123 will contain such particles, a filter mesh (not shown in the drawings) is preferably provided inside the conduit 130. The filter mesh is a porous mesh that can absorb particles, which can be used to filter the suspended particles in the air and prevent such particles from re-entering the box 120. By such circulation, the air in the box 120 can be purified. Preferably, the filter mesh is located near the air outlet 123 of the box; compared to locating it inside the conduit 130, locating it near the air outlet 123 makes it easier to manufacture, and can prevent dust from entering the air circulation device 150 to cause damage to the air circulation device 150. Of course, another filter mesh may be provided near the air inlet 124 of the box.

In this embodiment, because the light emitted by the wavelength conversion layer 110 has a Lambertian distribution, with a relatively large divergence angle, a collection lens 11 and collimating lens 12 are preferably provided sequentially on the converted light output side of the wavelength conversion layer 110, to respectively collect and collimate the converted light. Because the collection lens 11 typically has a relatively small size, it can be placed inside the box 120, located between the wavelength conversion layer 110 and the first area 121 (second area 122), to collect the converted light. The collimating lens 12 typically has a larger size, and can be placed outside of the box 120 near the first area 121 (second area 122). Of course, the two lenses can be placed both inside the box or both outside the box.

Second Embodiment

Figure 2A:
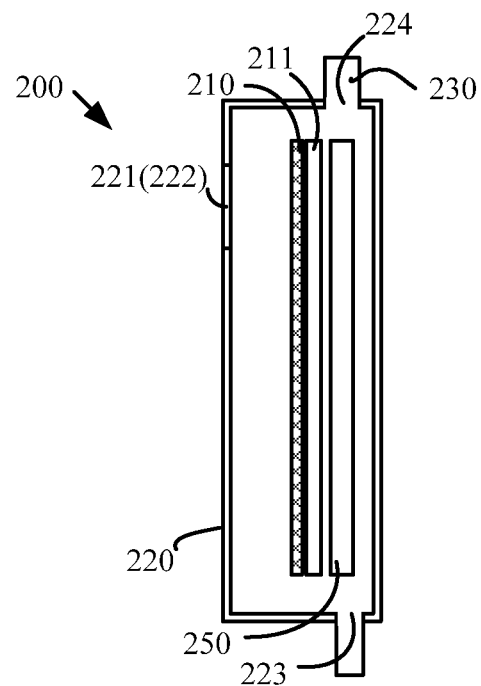
FIG. 2A schematically illustrates the structure of a wavelength conversion device according to another embodiment of the present invention.
Figure 2B:
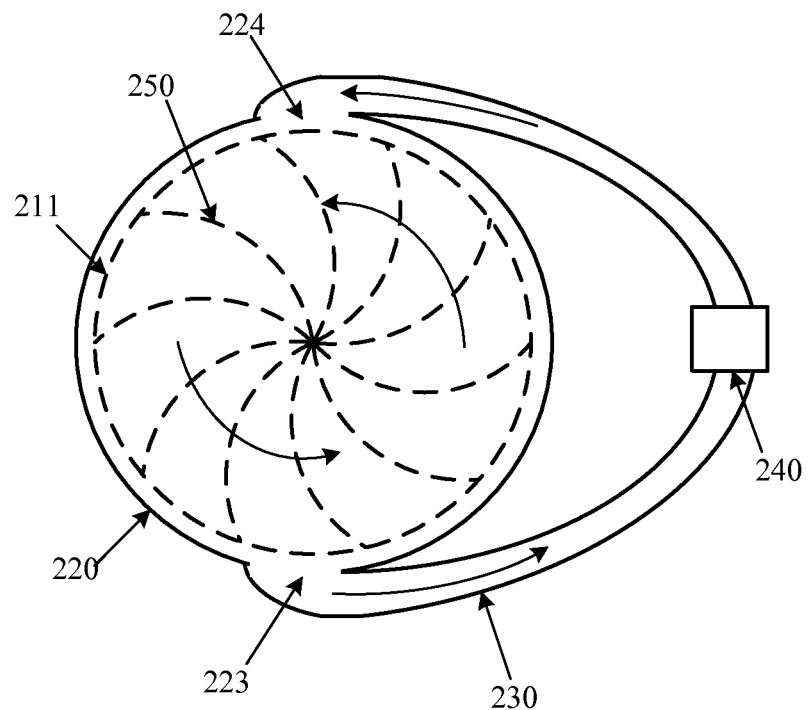
FIG. 2B is a right side view of the wavelength conversion device shown in FIG. 2A.

Refer to FIGS. 2A and 2B, where FIG. 2A schematically illustrates the structure of a wavelength conversion device according to another embodiment of the present invention, and FIG. 2B is a right side view of the wavelength conversion device shown in FIG. 2A. The wavelength conversion device 200 includes a wavelength conversion layer 210, a substrate 211, a box 220, a conduit 230, a heat exchanger 240, and an air circulation device 250. The box 220 includes a first area 221, a second area 222, an air outlet 223, and an air inlet 224.

Differences between this embodiment and the embodiment of FIG. 1A include:

In this embodiment, the air circulation device 250 is placed inside the box 220, and located on the side of the substrate 211 that faces away from the wavelength conversion layer 210. Correspondingly, the air outlet 223 and/or the air inlet 224 of the box 220 is located on the side of the plane of the substrate 211 that faces away from the wavelength conversion layer 210. This way, the air circulation device 250 exchanges the hot air on the side of the substrate 211 facing away from the wavelength conversion layer and the cool air in the conduit 230, to achieve heat dissipation.

Using a specific example, in this embodiment, the air circulation device 250 uses a tubular fan in lieu of the axial-flow fan 150 shown in FIGS. 1A and 1B to drive air exchange between the box 220 and conduit 230. In a tubular fan, both the air inflow and air outflow are in directions perpendicular to the axis of the fan.

In this embodiment, the fan 250 is located on a side of the substrate 211 facing away from the wavelength conversion layer 210, and the plane where the blades of the fan 250 are located is parallel to the substrate 211. The air outlet 223 and air inlet 224 are respectively located on the same cross-section of the box 220, and this cross-section is on the same plane as the blades of the fan 250. It should be understood that, the same plane here does not mean a strict plane; rather, it can be a macroscopic plane. When the fan 250 operates, the blades of the fan are driven by a drive device (not shown in the drawings) to rotate, and generates a rotating air flow around the blades of the fan 250; this air flow flows out of the air outlet 223, flows through the conduit 230, and flows into the box 220 via the air inlet 224, to accomplish air exchange between the box 220 and the conduit 230. The larger the radius of the blades of the fan 250, in particular, when the blades are very close to the edge of the box, the better the air circulation effect. Therefore, the diameter of the blades of the fan 250 is preferably just slightly smaller than the diameter of the box 220.

When the fan 250 rotates, the rotation direction of the air flow is along the tangent of the rotation direction of the fan 250. Therefore, the places where the conduit 230 is respectively connected to the air outlet 223 and air inlet 224 are preferably tangential to the box 220 and are along the air flow direction at the air outlet 223 and air inlet 224, so that the flowing air more easily enters the conduit 230.

In this embodiment, because air flow is primarily on the side of the substrate 211 facing away from the wavelength conversion layer 210, heat dissipation effect on the side of the wavelength conversion layer 210 facing the excitation light, i.e. the side of the wavelength conversion layer 210 facing away from the substrate 211, is not ideal, but still effective. The advantage of the wavelength conversion device of this embodiment is that it has a relatively simple structure, so it can be used in applications where the requirement for heat dissipation of the wavelength conversion layer is not very high.

Figure 3A:
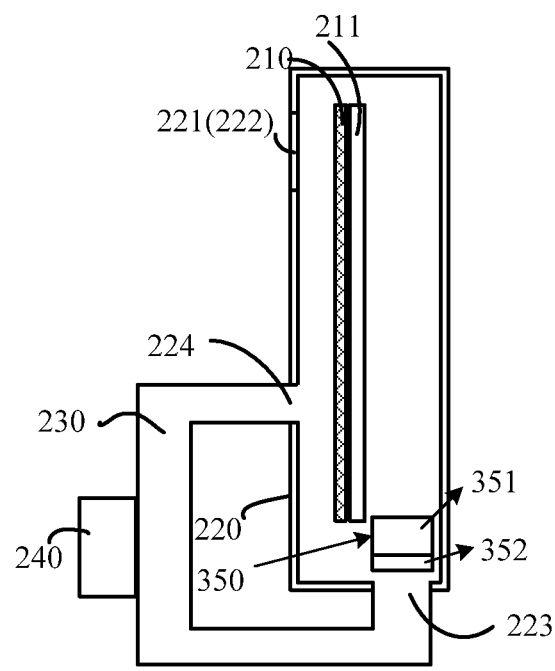
FIG. 3A schematically illustrates the structure of a wavelength conversion device according to another embodiment of the present invention.
Figure 3B:
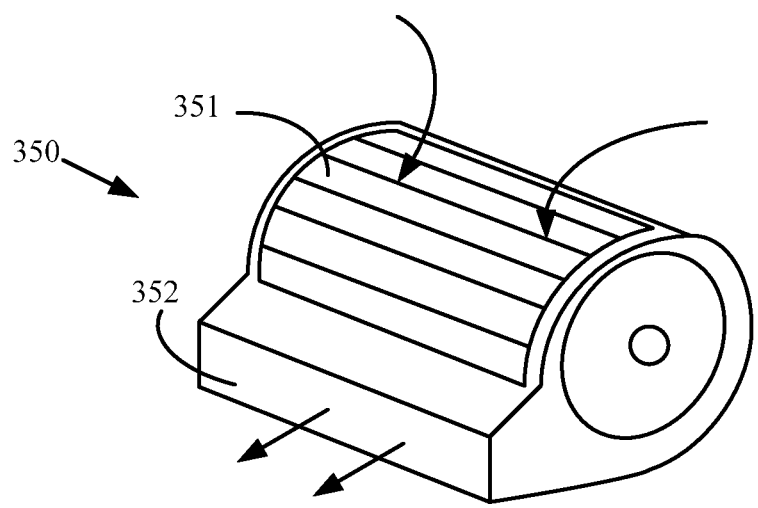
FIG. 3B is the structure of a cross-flow fan in the embodiment of FIG. 3A.

In this embodiment, the air circulation device can use other types of tubular fans, such as cross-flow fans. As shown in FIG. 3A, which schematically illustrates the structure of a wavelength conversion device according to another embodiment of the present invention, and as shown in FIG. 3B, which shows the structure of a cross-flow fan in the embodiment of FIG. 3A. The cross-flow fan 350 includes blades 351 and air outlet 352. The working principle of the cross-flow fan is to draw air into the fan by the rotation of the blades 351, and the air exits from the air outlet 352.

In this embodiment, the cross-flow fan 350 is located inside the box 220 at the air outlet 223, and the air outlet 352 of the cross-flow fan 350 faces the air outlet 223 of the box 220. When the cross-flow fan 350 operates, the rotation of the blades 351 draws the air from the box 220 into the fan, and the air is expelled from the air outlet 352 and enters the conduit 230 via the air outlet 223 of the box 220, to achieve heat dissipation. Because the cross-flow fan 350 generates a pressure difference between the interiors of the box 220 and the conduit 230, the cool air in the conduit 230 enters the box 220 due to this pressure difference, to achieve heat dissipation for the wavelength conversion layer 210.

Preferably, the air inlet 224 of the box 220 is located on the side of the box 220 that faces the wavelength conversion layer 210, so that the cool air from the conduit 230 is blown toward the wavelength conversion layer 210, to better accomplish heat dissipation for the wavelength conversion layer 210.

Compared to the tubular fan shown in FIG. 2A, the cross-flow fan in this embodiment has the advantage of low noise, and can provide relatively high efficiency in situations where the internal pressure of the box is low and when the size of the box is relatively small. In this embodiment, the air circulation device can also be located between the wavelength conversion layer 210 and the first area 221 (second area 222), to drive the hot air on the excitation light input side of the wavelength conversion layer 210 to directly exchange with the cool air in the conduit 230. Because the side of the wavelength conversion layer 210 that receives the excitation light generates the most heat, and the air circulation device directly dissipates heat for the hot air on the side of the wavelength conversion layer that generates the most heat, compared to the wavelength conversion device of FIG. 2A, this embodiment achieves better heat dissipation effect.

Figure 4A:
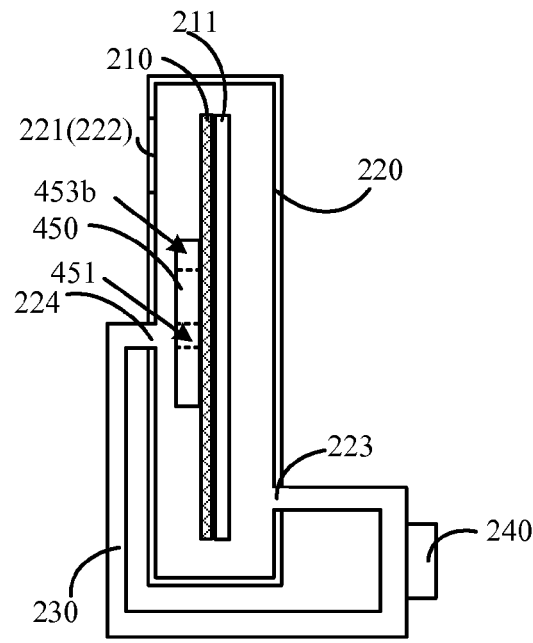
FIG. 4A schematically illustrates the structure of a wavelength conversion device according to another embodiment of the present invention.

In a specific example, refer to FIG. 4A, which schematically illustrates the structure of a wavelength conversion device according to another embodiment of the present invention. In this embodiment, the air circulation device 450 uses a radial-flow fan, i.e. a centrifugal fan, in lieu of the tubular fan 150 in FIG. 2A, to drive the air exchange between the box 220 and the conduit 230. The working principle of the centrifugal fan is to draw air in the axial direction into the fan, and expels the air out in the circumferential direction by centrifugal force.

Figure 4B:
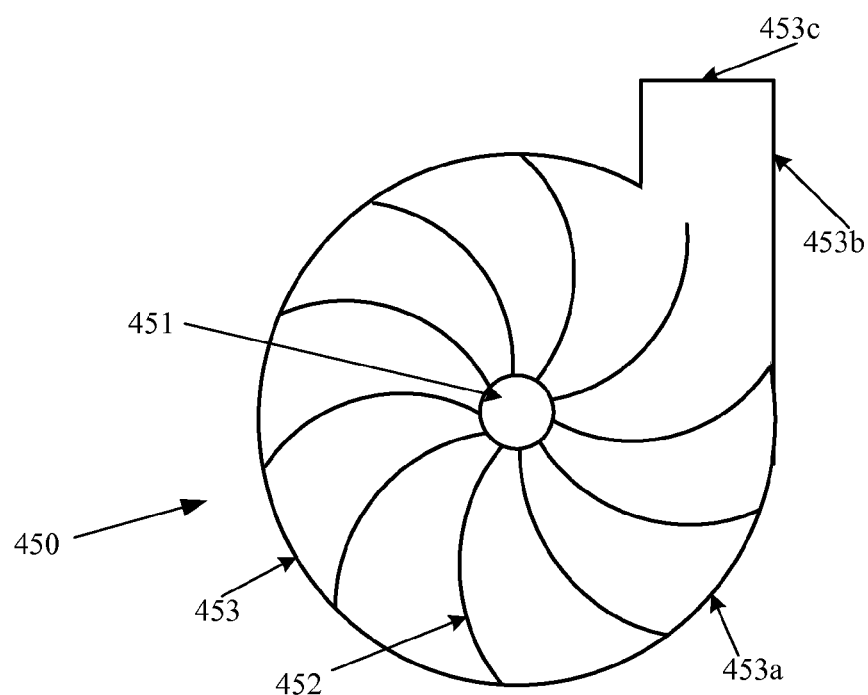
FIG. 4B is the structure of a centrifugal fan in the embodiment of FIG. 4A.

Refer to FIG. 4B, which is the structure of a centrifugal fan in the embodiment of FIG. 4A. In this embodiment, the centrifugal fan 450 includes a ring axle 451, multiple blades 452 on the ring axle 451, and a shell 453 surrounding the blades 452. The shell 453 is shaped like a whistle, including a cylindrical shaped shell body 453a surrounding the blades 452, and a cuboid shaped shell body 453b which is disposed on the surface of the cylinder along its tangential direction, which are formed integrally into one body. The cuboid shaped shell body 453b has an opening on a side 453c which faces away from the cylindrical shell body 453a, which constitutes the outlet 453c of the centrifugal fan 450.

The centrifugal fan 450 is located inside the box 220, its plane where the multiple blades 452 are located being parallel to the wavelength conversion layer 210. The centrifugal fan 450 is located on the excitation light input side of the wavelength conversion layer 210, and its outlet 453c faces toward the location above where the wavelength conversion layer 210 is illuminated by the excitation light. Preferably, the outlet 453c of the centrifugal fan 450 faces the position of the light spot on the wavelength conversion layer 210, to better achieve heat dissipation for the wavelength conversion layer 210. This can be accomplished by arranging the opening direction of the outlet 453c of the centrifugal fan 450, or by using a nozzle connected to the outlet 453c of the centrifugal fan 450 and arranging the direction of the nozzle to face the light spot on the wavelength conversion layer 210. The opening of the ring axle 451 that faces away from the wavelength conversion layer 210 faces the air inlet 224, and the location of the centrifugal fan 450 is arranged to avoid the light propagation path of the excitation light and the converted light. In this embodiment, the air inlet 224 is located on the side of the first area 221 (second area 222) of the box 220, and avoids the first area 221 (second area 222).

When the centrifugal fan 450 operates, due to the centrifugal force of the centrifugal fan 450, the cool air in the conduit 230 is drawn into the ring axle 451 via the air inlet 224, and expelled in the circumferential direction by the rotation of the multiple blades 452. Therefore, the opening of the ring axle 451 of the centrifugal fan 450 is preferably located relatively close to the air inlet 224. Because of the presence of the shell 453, the air inside the ring axle 451 becomes a high pressure air at the outlet 453c of the shell body 453b of the shell 453, and blown to the wavelength conversion layer 210 where the light spot is, to carry away the heat generated by the wavelength conversion layer 210 due to excitation, which achieves heat dissipation for the wavelength conversion layer 210.

In practical applications, the air inlet 224 may be located not on the side of the box 220 where the first area 221 (second area 222) is, but on another side of the box 220. In this case, a curved tube may be used to connect the air inlet 224 to the ring axle 451 of the centrifugal fan 450.

Of course, the outlet 453c of the shell body 453b may face not toward the location of the light spot on the wavelength conversion layer but face another direction; as long as the air is blown into the box 220, heat dissipation for the wavelength conversion layer 210 can be achieved.

Figure 4C:
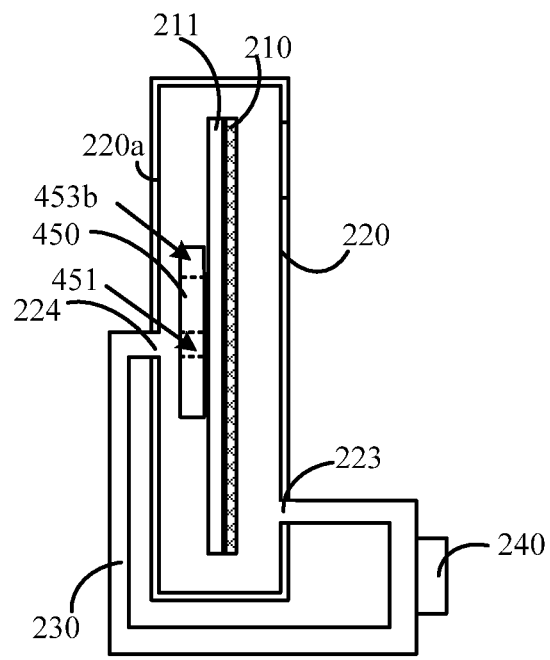
FIG. 4C schematically illustrates the structure of a wavelength conversion device according to another embodiment of the present invention.

Refer to FIG. 4C, which schematically illustrates the structure of a wavelength conversion device according to another embodiment of the present invention. The descriptions below refer to FIGS. 4B and 4C. In this embodiment, the centrifugal fan 450 can be located on the side of the substrate 211 that faces away from the wavelength conversion layer 210. Because the air inlet 224 should be face the opening of the ring axle 451 of the centrifugal fan 450 that faces away from the wavelength conversion layer 210, the air inlet 224 is located on a surface 220a of the box 220 that faces the opening. The centrifugal fan 450 is located between the surface 220a and the substrate 211, and the plane where the multiple blades 452 are located is parallel to the substrate 211.

To enhance heat dissipation effect for the wavelength conversion layer 210, the centrifugal fan 450 can further include a curved tube (not shown in the drawings). The curved tube includes a first end and a second end, where the first end is connected to the outlet 453c of the cuboid shaped shell body 453b of the shell 453 of the centrifugal fan 450, and the second end is located near the light spot formed by the excitation light on the wavelength conversion layer 210 and face the position of the light spot on the wavelength conversion layer 210. This way, the cool air coming out of the outlet 453c of the centrifugal fan 450 can be directed by the curved tube to the wavelength conversion layer and blown toward the position of the light spot, to dissipate the heat at the position of the wavelength conversion layer where heat is generated due to excitation.

Because the centrifugal fan is located on a side of the wavelength conversion layer facing away from the incident excitation light (which is also the light exit side), any light loss due to scattering and reflecting of a part of the output light of the wavelength conversion layer by the centrifugal fan is prevented; meanwhile, using the curved tube allows heat dissipation for the side of the wavelength conversion layer that generates the most heat.

Figure 5A:
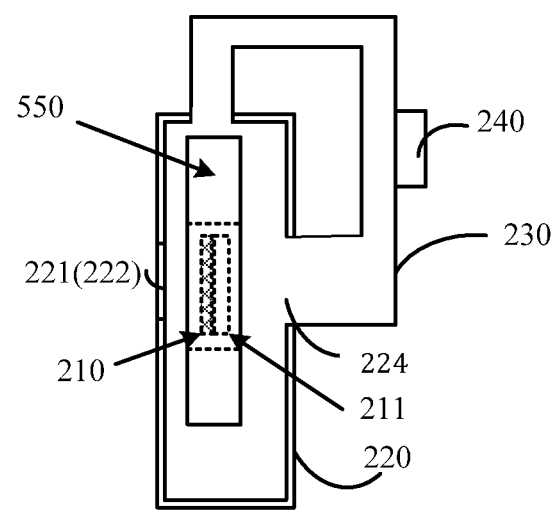
FIG. 5A schematically illustrates the structure of a wavelength conversion device according to another embodiment of the present invention.
Figure 5B:
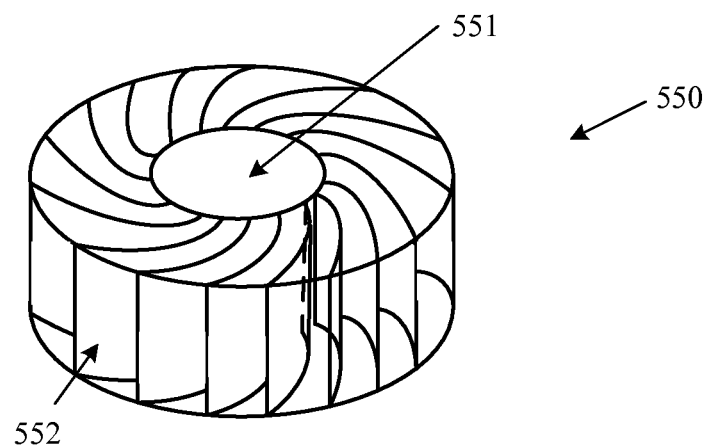
FIG. 5B illustrates the structure of centrifugal fins in the wavelength conversion device of FIG. 5A.

In this embodiment, the wavelength conversion layer can be located inside the air circulation device, so that the wavelength conversion device can have a more compact structure. Refer to FIG. 5A, which schematically illustrates the structure of a wavelength conversion device according to another embodiment of the present invention. In this embodiment, the air circulation device 550 employs another type of radial-flow fan, i.e. using centrifugal fins in lieu of the centrifugal fan 450 in FIG. 4A, to drive the air exchange between the box 220 and the conduit 230. Refer to FIG. 5B, which illustrates the structure of centrifugal fins in the wavelength conversion device of FIG. 5A. The centrifugal fins 550 includes a ring axle 551 and multiple blades 552 disposed on the ring axle 551. A difference between the centrifugal fins and centrifugal fan is that the centrifugal fins do not have a housing to enclose the blades.

The wavelength conversion layer 210 and the substrate 211 are both disposed inside the ring axle 551 of the centrifugal fins 550, and are perpendicular to the direction of the ring axle 551.

When the centrifugal fins 550 operate, the centrifugal force of the centrifugal fins 550 generates a pressure difference between the conduit 230 and the box 220, so that the cool air in the conduit 230 is drawn through the air inlet 224 into the box 220 and into the ring axle 551 of the centrifugal fins 550, and blown toward the substrate 211 located inside the ring axle 551, to dissipate heat for the wavelength conversion layer 210 which is located on the substrate and faces away from the air inlet 224. The heat generated by the wavelength conversion layer 210 is carried away from the centrifugal fins 550 by the blades 552 of the centrifugal fins, and enters the conduit 230 under the pressure difference between the box 220 and the conduit 230 to dissipate the heat.

In this embodiment, as compared to the centrifugal fan, the centrifugal fins do not have the outer housing, so its design is more compact and the noise is lower when operating.

Figure 5C:
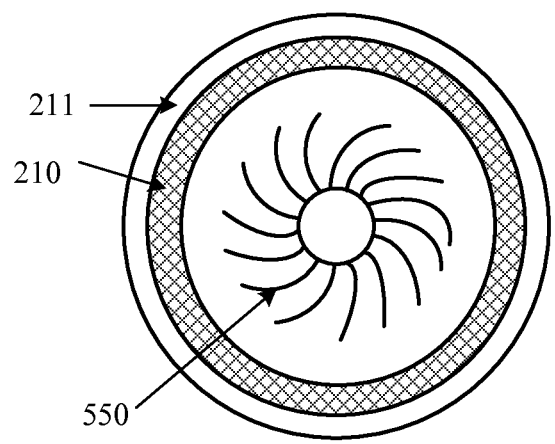
FIG. 5C schematically illustrates the structures of the substrate, wavelength conversion layer and centrifugal fins in the wavelength conversion device in this embodiment.

In this embodiment, the centrifugal fins 550 can be located at the center of the substrate 211, while the wavelength conversion layer 210 is a ring shape disposed around the centrifugal fins 550. Refer to FIG. 5C, which schematically illustrates the structures of the substrate, wavelength conversion layer and centrifugal fins in the wavelength conversion device in this embodiment.

When the centrifugal fins 550 operate, under the centrifugal force of the centrifugal fins 550, the cool air in the conduit 230 is drawn through the air inlet 224 into the ring axle 551 of the centrifugal fins 550, and is expelled in the circumferential direction driven by the rotation of the blades 552. Because there is no outer housing, when the air is expelled from the centrifugal fins it does not exit through one opening, but rather, along the tangential direction all around the centrifugal fins. This way, the cool air expelled from the centrifugal fins dissipates heat for not one specific location of the wavelength conversion layer, but multiple locations of the wavelength conversion layer simultaneously.

In this embodiment, the location of the centrifugal fins 550 can be the same as the centrifugal fan 450, which is on the side of the substrate 211 facing away from the wavelength conversion layer 210, or on the side of the substrate 211 where the wavelength conversion layer 210 is but avoiding the propagation path of the excitation light. This way, compared to putting the wavelength conversion layer 210 outside and around the centrifugal fins 550, the radius of the wavelength conversion device can be made relatively small. It should be noted that in the above embodiments the air circulation device can be located in other places, such as inside the conduit, and not limiter to the above described positions.

Third Embodiment

Figure 6:
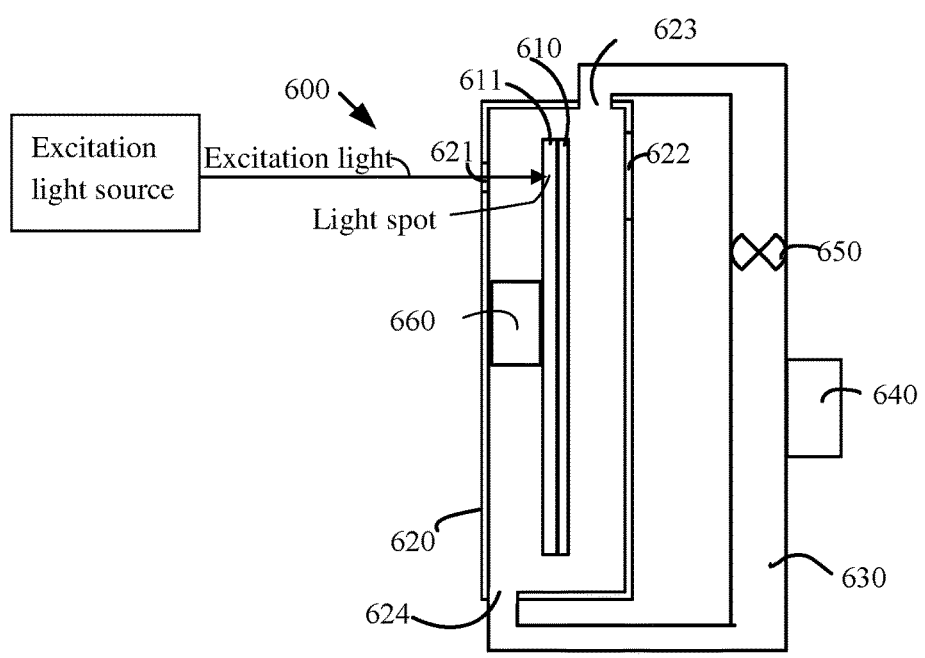
FIG. 6 schematically illustrates the structure of a wavelength conversion device according to another embodiment of the present invention.

Refer to FIG. 6, which schematically illustrates the structure of a wavelength conversion device according to another embodiment of the present invention. As shown in FIG. 6, the wavelength conversion device 600 includes a wavelength conversion layer 610, a substrate 611, a box 620, a conduit 630, a heat exchanger 640, an air circulation device 650, and a drive device 660. The box 620 includes a first area 621, a second area 622, an air outlet 623 and an air inlet 624.

Differences between this embodiment and the above embodiments include:

In this embodiment, the wavelength conversion device 600 further includes a drive device 660 (such as a motor), fixedly coupled to the substrate 611, to drive the wavelength conversion layer 610 to rotate periodically. The surface of the drive device 660 that faces away from the substrate 611 is fixedly connected to the inner surface of the box 620. The substrate 611 is preferably round plate, with at least two segments along the circumferential direction, the segments carrying different wavelength conversion layers 610 to convert the excitation light into different converted lights. When the drive device 660 drives the substrate 611 to rotate the wavelength conversion layer 610, the various segments of the wavelength conversion layers 610 on the substrate 611 are sequentially disposed on the illumination path of the excitation light, so that the wavelength conversion layer 610 sequentially outputs different converted lights. The at least two segments may also include at least one segment carrying a wavelength conversion layer, and at least one segment carrying no wavelength conversion layer or being transparent. Of course the substrate 611 may have only one segment along the circumferential direction.

Further, because the drive device has a power line, the box 620 can have an opening (not shown in the drawings) sized to allow the power line to pass through. Preferably, the opening is provided with a rubber ring around the power line to seal the opening, to ensure the sealing of the system. In other embodiments, the drive device can be one that does not have a power line; the power terminals of the drive device may be soldered on one side of a PCB, and the box may have an opening, so that the PCB covers the opening; multiple conductors may be provided outside the box, coupled to the various terminals of the PCB, so that the power lines of the drive device are moved to the outside of the box.

In this embodiment, different locations of the wavelength conversion device are periodically disposed on the illumination path of the excitation light to be excited; thus, for each position, the time duration of excitation is only the moment when it is rotated to the illumination path of the excitation light, so its temperature can be greatly reduced and its efficiency is greatly improved.

Figure 7A:
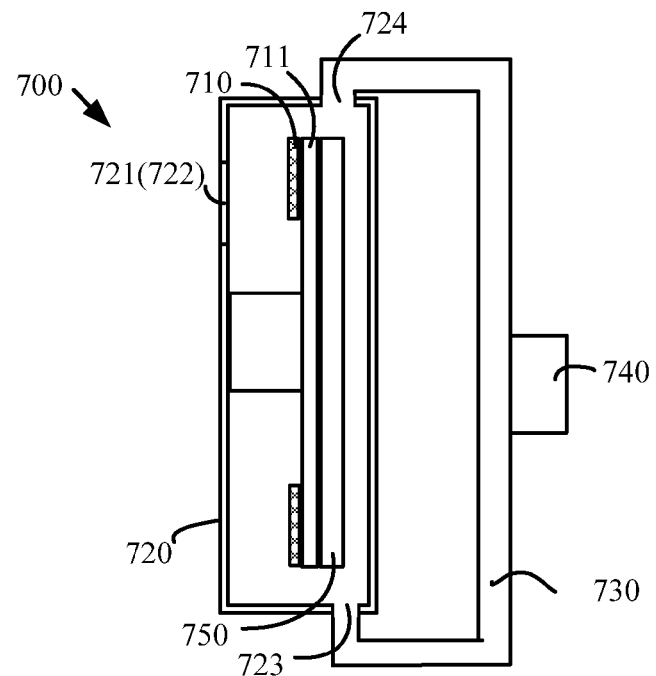
FIG. 7A schematically illustrates the structure of a wavelength conversion device according to another embodiment of the present invention.

In this embodiment, the blades of the air circulation device in the earlier embodiments may be fixedly connected to the drive device 660, or the blades of the air circulation device may be directly affixed to the drive device, such that the blades and the substrate 611 are driven by the drive device to move synchronously. For example, refer to FIG. 7A, which schematically illustrates the structure of a wavelength conversion device according to another embodiment of the present invention. As shown in FIG. 7A, the wavelength conversion device 700 includes a wavelength conversion layer 710, a substrate 711, a box 720, a conduit 730, a heat exchanger 740, an air circulation device 750, and a drive device 760. The box 720 includes a first area 721, a second area 722, an air outlet 723 and an air inlet 724.

Differences between this embodiment and the embodiment of FIG. 2A include:

The wavelength conversion layer 710 is a ring shape and disposed on the side of the substrate 711 facing the first area 721 (second area 722). The blades of the tubular fan 750 are directly affixed on the substrate 711 on the side facing away from the wavelength conversion layer 710. The drive device 710 (such as a motor) is fixedly connected to a central region of the substrate 711 on the side that carries the wavelength conversion layer 710, for driving the substrate 711, the wavelength conversion layer 710 and the blades of the tubular fan 750 to rotate synchronously.

In this embodiment, the drive component of the drive device also functions as the drive component of the air circulation device, so that the structure of the wavelength conversion device is simpler. Because the separate drive component of the air circulation device is eliminated, the cost is reduced.

Figure 7B:
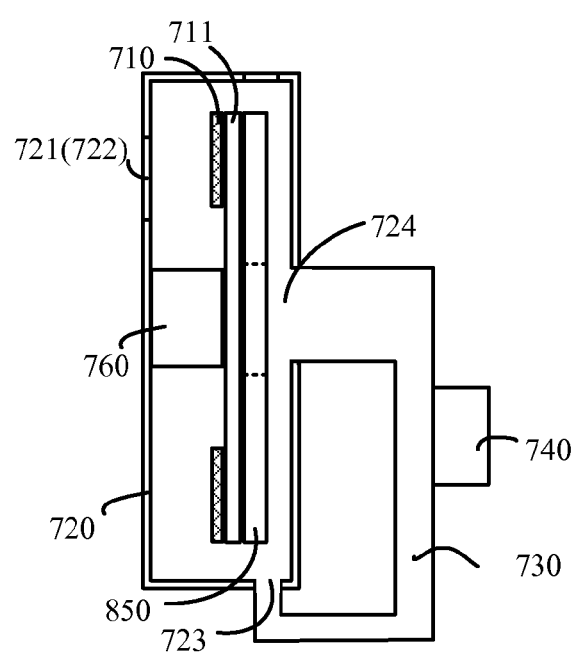
FIG. 7B schematically illustrates the structure of a wavelength conversion device according to another embodiment of the present invention.

In the wavelength conversion device shown in FIG. 7A, the tubular fan 750 may alternatively be centrifugal fins. Refer to FIG. 7B, which schematically illustrates the structure of a wavelength conversion device according to another embodiment of the present invention.

Figure 7C:
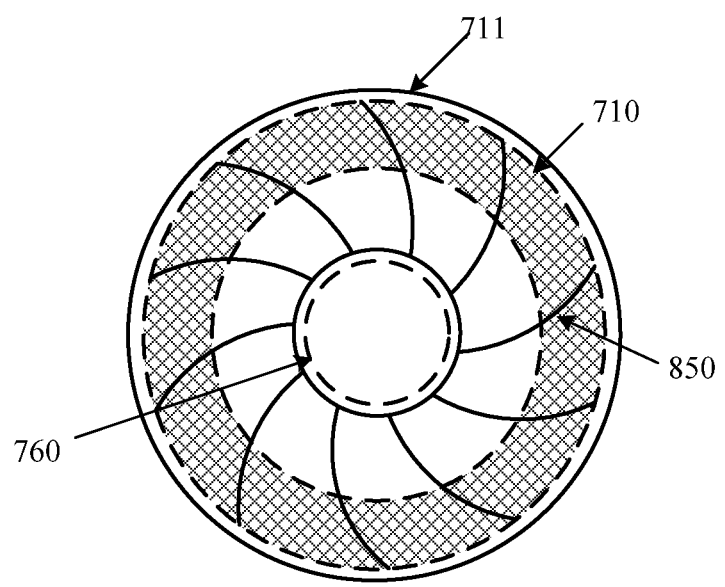
FIG. 7C schematically illustrates a part of the structures of the wavelength conversion device of FIGS. 7A and 7B.

Differences between this embodiment and the embodiment of FIG. 4A include:

Refer to FIG. 7C, which schematically illustrates a part of the structures of the wavelength conversion device of FIG. 7B. In this embodiment, the centrifugal fins 850 are affixed to the substrate 711 on a side facing away from the wavelength conversion layer 710. The drive device 760 is disposed in a central region of the substrate 711 on the side that carries the wavelength conversion layer 710, for driving the substrate 711 to rotate. Because the wavelength conversion layer 710 and the centrifugal fins 850 are both affixed to the substrate 711, the three are driven by the drive device to rotate synchronously.

Compared to the embodiment of FIG. 7A, the heat dissipation effect of the centrifugal fins in this embodiment is better than that of the tubular fan in the embodiment of FIG. 7A. The above embodiments use examples where the drive device drives round plate shaped wavelength conversion layers to rotate periodically, but the invention is not limited to such. In other embodiment, the wavelength conversion layer can be cylindrical shapes that rotate periodically under the drive force of the drive device; or, the drive device may drive the wavelength conversion layer to oscillate back and forth, and the wavelength conversion layer may be strip shapes which move laterally periodically under the driving force of the drive device. In such a situation, the drive device may simultaneously function to drive the air circulation; such designs can be achieved based on actual working principles of the drive device and the air circulation device. This can be readily achieved and are not described in more detail here.

The various embodiments in this disclosure are described in a progressive manner, where each embodiment is described by emphasizing its differences from other embodiments. The common or similar features of the embodiments can be understood by referring to each other.

Another embodiment of the present invention provides a light emitting device, including the excitation light source generating an excitation light, and a wavelength conversion device, where the wavelength conversion device has the structure and function of the various embodiments described above.

The above descriptions disclose the embodiments of the present invention, but do not limit the scope of the invention. Thus, it is intended that the present invention cover modifications and variations that come within the scope of the appended claims and their equivalents, as well as direct or indirect applications of the embodiments in other related technical fields.

What is claimed is:

1. A wavelength conversion device, comprising:
   a wavelength conversion layer for absorbing an excitation light and generating a converted light;
   a box, which includes a first area for transmitting the excitation light to the wavelength conversion layer and a second area for transmitting the converted light, and further includes an air inlet and an air outlet, wherein the air outlet and the air inlet are located on two opposite sides of a plane of the wavelength conversion layer, and wherein the wavelength conversion layer is located between the air outlet and the air inlet;
   a conduit, disposed outside of the box, for connecting the air inlet and the air outlet, which cooperates with the box to seal the wavelength conversion layer inside the box, wherein the box and the conduit are configured to conduct an air flow from the air inlet through the box to the air outlet and from the air outlet through the conduit to the air inlet;
   a heat exchanger, for lowering a temperature of air inside the conduit; and
   an air circulation device, disposed in a sealed space formed by the box and the conduit, for driving an air exchange between the box and the conduit, wherein the air exchange includes the air flow from the air inlet through the box to the air outlet and from the air outlet through the conduit to the air inlet.

2. The wavelength conversion device of claim 1, further comprising a filter mesh, disposed in the conduit and located at the air outlet or air inlet.

3. The wavelength conversion device of claim 1, wherein the heat exchanger and the conduit is one integral unit, the unit including a metal pipe.

4. The wavelength conversion device of claim 1, wherein the air circulation device is located on a side of the wavelength conversion layer facing away from the output converted light.

5. The wavelength conversion device of claim 1, wherein the air circulation device includes a radial-flow fan, located inside the conduit or the box.

6. The wavelength conversion device of claim 5, wherein the radial-flow fan includes a centrifugal fan, located inside the box, wherein an opening of a ring axle of the centrifugal fan corresponds in spatial position with the air inlet.

7. The wavelength conversion device of claim 5, wherein the radial-flow fan includes centrifugal fins, located inside the box, wherein an opening of a ring axle of the centrifugal fins corresponds in spatial position with the air inlet.

8. The wavelength conversion device of claim 1, further comprising a drive device, for driving the wavelength conversion layer, so that a light spot formed by the excitation light on the wavelength conversion layer acts on the wavelength conversion layer along a predetermined path.

9. The wavelength conversion device of claim 8, wherein the air circulation device includes a plurality of blades, which are affixed to the drive device, wherein the plurality of blades and the wavelength conversion layer are driven by the drive device to move synchronously.

10. The wavelength conversion device of claim 9, further comprising a substrate, wherein the wavelength conversion layer is disposed on the substrate, and
   wherein the blades are located on a side of the substrate facing away from the wavelength conversion layer.

11. The wavelength conversion device of claim 1, wherein the air inlet is located relatively close to a light spot formed on the wavelength conversion layer by the excitation light, wherein being relatively close to means that, of a set of distances between all points of the box and the light spot formed on the wavelength conversion layer, a distance between the air outlet and the light spot is among a shortest 50% of all such distances.

12. A light emitting device, comprising:
the wavelength conversion device of claim 1; and
an excitation light source for generating the excitation light.

* * * * *